(12) United States Patent
Albers et al.

(10) Patent No.: US 11,040,475 B2
(45) Date of Patent: Jun. 22, 2021

(54) VERTICALLY ADDED PROCESSING FOR BLOW MOLDING MACHINE

(71) Applicant: Graham Packaging Company, L.P., Lancaster, PA (US)

(72) Inventors: Martin R. Albers, York, PA (US); Brent Heenan, Morrow, OH (US); Keith Folkenroth, Red Lion, PA (US); Roman Justice, Lititz, PA (US); Brian Hagan, York, PA (US)

(73) Assignee: GRAHAM PACKAGING COMPANY, L.P., Lancaster, PA (US)

( * ) Notice: Subject to any disclaimer, the term of this patent is extended or adjusted under 35 U.S.C. 154(b) by 290 days.

(21) Appl. No.: 16/122,300

(22) Filed: Sep. 5, 2018

(65) Prior Publication Data

US 2019/0077064 A1 Mar. 14, 2019

Related U.S. Application Data

(60) Provisional application No. 62/555,973, filed on Sep. 8, 2017.

(51) Int. Cl.
*B29C 49/04* (2006.01)
*B29C 48/09* (2019.01)
(Continued)

(52) U.S. Cl.
CPC ............ *B29C 49/041* (2013.01); *B29C 48/09* (2019.02); *B29C 49/04* (2013.01); *B29C 49/36* (2013.01);
(Continued)

(58) Field of Classification Search
None
See application file for complete search history.

(56) References Cited

U.S. PATENT DOCUMENTS 4,257,527 A 3/1981 Snyder et al.
4,659,531 A 4/1987 Ezaki
(Continued)

FOREIGN PATENT DOCUMENTS

BE 779464 6/1972
CN 1355092 6/2002
(Continued)

OTHER PUBLICATIONS

Machine English translation of JPH03189109A, Retrieved Oct. 30, 2020 (Year: 1989).*
(Continued)

*Primary Examiner* — Peter L Vajda
*Assistant Examiner* — Adrianna N Konves
(74) *Attorney, Agent, or Firm* — Stradley Ronon Stevens and Young, LLP

(57) ABSTRACT

A vertical additive processing system for use with a blow molding machine having a flow head from which a plastic parison is delivered to a mold and producing an article. The system has a servo-controlled accumulation technology (SCAT) unit including (a) an accumulator collecting plastic material when retracted and delivering plastic material when extended, and (b) an actuator directing the accumulator to retract and extend. The system further has a tooling unit including a bushing body adapted to engage the flow head, a distribution ring, a bushing cap, a central aperture defining a main parison flow path, and a distribution channel delivering additional plastic material received from the accumulator to the main parison flow path. The system still further has a material duct connecting the two units through which plastic material delivered by the SCAT unit is transported to and received by the tooling unit.

20 Claims, 17 Drawing Sheets

(51) Int. Cl.
*B29C 49/36* (2006.01)
*B29C 49/22* (2006.01)
*B29C 48/19* (2019.01)
*B29C 48/00* (2019.01)
*B29C 48/21* (2019.01)
*B29C 48/20* (2019.01)
*B29C 48/335* (2019.01)
*B29C 48/34* (2019.01)
*B29C 48/25* (2019.01)
*B29L 31/00* (2006.01)

(52) U.S. Cl.
CPC ........ *B29B 2911/1406* (2013.01); *B29B 2911/14073* (2013.01); *B29B 2911/14086* (2013.01); *B29C 48/0017* (2019.02); *B29C 48/19* (2019.02); *B29C 48/20* (2019.02); *B29C 48/21* (2019.02); *B29C 48/2694* (2019.02); *B29C 48/336* (2019.02); *B29C 48/34* (2019.02); *B29C 2049/047* (2013.01); *B29C 2049/048* (2013.01); *B29C 2049/222* (2013.01); *B29C 2049/224* (2013.01); *B29C 2049/225* (2013.01); *B29C 2049/228* (2013.01); *B29C 2948/926* (2019.02); *B29C 2948/92904* (2019.02); *B29L 2031/712* (2013.01)

(56) References Cited

U.S. PATENT DOCUMENTS

| | | | |
|---|---|---|---|
| 4,919,983 | A | 4/1990 | Fremin |
| 5,460,772 | A | 10/1995 | Ohta |
| 5,500,173 | A | 3/1996 | Dugan |
| 5,865,338 | A | 2/1999 | Conn |
| 6,649,122 | B1 | 11/2003 | Lough et al. |
| 2002/0074677 | A1 | 6/2002 | Przytulla et al. |
| 2005/0037169 | A1 | 2/2005 | Przytulla et al. |
| 2005/0158490 | A1 | 7/2005 | Huang et al. |
| 2009/0085243 | A1 | 4/2009 | Taylor et al. |

FOREIGN PATENT DOCUMENTS

| | | |
|---|---|---|
| CN | 1373037 | 10/2002 |
| DE | 1915792 | 10/1970 |
| DE | 1915802 | 10/1970 |
| DE | 2421699 | 7/1975 |
| DE | 3316149 | 11/1984 |
| DE | 3825375 | 2/1990 |
| DE | 4136766 | 5/1993 |
| DE | 202004018510 | 9/2005 |
| EP | 39490 | 11/1981 |
| EP | 482972 | 4/1992 |
| EP | 726132 | 8/1996 |
| EP | 726133 | 8/1996 |
| EP | 1082204 | 3/2001 |
| EP | 1157802 | 11/2001 |
| EP | 1559529 | 8/2005 |
| EP | 1772385 | 1/2007 |
| FR | 2751583 | 1/1998 |
| GB | 1107628 | 3/1968 |
| GB | 2024087 | 1/1980 |
| GB | 2191145 | 12/1987 |
| GB | 2393961 | 4/2004 |
| JP | 53083884 | 7/1978 |
| JP | 59192536 | 10/1984 |
| JP | 61017249 | 1/1986 |
| JP | 61089023 | 5/1986 |
| JP | 1241426 | 9/1989 |
| JP | 2030637 | 2/1990 |
| JP | 3189109 | 8/1991 |
| JP | 4107107 | 4/1992 |
| JP | 8300455 | 1/1996 |
| JP | 9155962 | 6/1997 |
| JP | 10323884 | 12/1998 |
| JP | 2000117820 | 4/2000 |
| JP | 2000255578 | 9/2000 |
| WO | 2004/022307 | 3/2004 |
| WO | 2007/098837 | 9/2007 |
| WO | 2015/108494 | 7/2015 |

OTHER PUBLICATIONS

International Search Report for International Application No. PCT/US2018/049699 issued by the European Patent Office dated Jan. 3, 2019.

* cited by examiner

VERTICALLY ADDED PROCESSING FOR BLOW MOLDING MACHINE

RELATED APPLICATION

This application claims the benefit of priority to U.S. Provisional Patent Application Ser. No. 62/555,973, filed on Sep. 8, 2017, the contents of which are incorporated in this application by reference.

TECHNICAL FIELD

The present disclosure relates generally to machines for manufacturing hollow articles from thermoplastic materials by blow molding and, more particularly, to a blow molding machine designed to add material to certain portions of an article, thereby strengthening the article without affecting the rest of the article.

BACKGROUND OF THE DISCLOSURE

Blow molding is a fabrication method for hollow thermoplastic shapes. There are two general classes of plastic products made using the blow molding process and related machinery: packaging products and technical parts. Packaging products include such items as bottles, jars, jugs, cans, and other containers. Technical parts include automotive components such as bumpers, fuel tanks, functional fluid containers, ducting, and the like. The term "articles" is used to encompass either or both packaging products and technical parts.

The blow molding process can be of two general types: extrusion blow molding and injection blow molding. In extrusion blow molding, a thermoplastic parison is delivered from an extruder to and between mold halves. The mold halves close around the parison, and the parison is then expanded against a mold cavity by introduction of a blowing gas, usually air. In injection molding, a thermoplastic material is first injection molded into a preform parison which is then transferred to a blow mold and expanded in the same manner as in an extrusion blow molding process.

In intermittent extrusion, the molds are mounted to a common platen and the parisons are extruded by either a reciprocating screw extruder or by a ram accumulator which holds in readiness a volume of molten plastic material needed to make the next article or articles. In continuous extrusion, a molten parison is produced from an extruder die without interruption, and a segment of the parison is severed and positioned into a mold. The molds can be moved from station to station on rotating vertical wheels, on a rotating horizontal table, or with a reciprocating action. When the parison is extruded, the mold is moved proximate (e.g., over or under) the extruder die or flow head to receive the parison segment and then is moved to a blowing station.

The positioning of the parison relative to the mold in a rotary system is relatively difficult. Therefore, many of the current blow molding machines use the reciprocating mold concept according to which the molds are shuttled back and forth from station to station. A major drawback of the reciprocating mold concept, however, is a limitation on production rate.

Horizontal rotary blow molding machines allow for high production rates of uniform articles. Such machines index circumferentially spaced mold halves in steps around a vertical axis. The mold halves each capture a vertical, continuously growing parison at an extrusion station. In one machine, the flow head extruding the parison moves up away from the mold halves after the mold halves close to capture the parison. The parison is severed adjacent the top of the mold halves, the mold halves are moved away from the extrusion station, and a top blow pin is moved into the end of the captured parison at the top of the mold halves to seal the mold cavity and blow the parison. Subsequently, the flow head and dependent parison are lowered back to the initial position so that the new parison is in position to be captured by the next pair of mold halves. The blown parison cools as the mold halves are rotated around the machine, following which the mold halves open at an ejection station and the finished article, commonly a bottle or other article, is ejected from between the mold halves. The machine includes an in-mold labeling station between the ejection station and the extrusion station for applying labels to the interior surfaces of the mold cavities.

In another horizontal rotary blow molding machine the parison grows down over a blow pin at the bottom of the mold halves before closing of the mold halves. The flow head is moved up above the closed mold before severing of the new parison from the captured parison. The mold is then indexed laterally to the next station without dropping and the captured parison is blown within the cavity. In a further horizontal rotary blow molding machine, the whole turntable supporting all of the mold halves is raised and lowered during rotation as each mold captures a parison at the extrusion station.

In the production of plastic articles using the blow molding process, it is usually desirable to obtain a finished article with a consistent, uniform wall thickness, given that a thin area usually creates a weak spot in the article. Weak spots are a particular problem in blow molding where the hot parison exiting from the extruder nozzle is automatically elongated or stretched as a function of its progressively greater length and weight, leading to a thinning of the wall thickness of the parison during the extrusion, while in the blow forming process it is exposed to strongly varied stretch forces especially in the areas near the flash and shear edges perpendicular to the parison and to the plane of separation of the blow mold. This problem is typically addressed by controlling the rate at which the parison exits the extruder nozzle. Such control requires special ancillary equipment for the extruder, however, with dual adjustments for the annular extrusion nozzle as well as special techniques and control programs for sectional wall-thickness adjustment of the extruded parison in adaptation to the specific, varying article shape to be produced. A number of nozzle-control systems for sectional or partial wall-thickness control have been taught through the years.

In 1968, for example, British Patent No. 1,107,628 taught a parison extrusion process in which the extruder nozzle outlet passage is defined by the tip of a mandrel and a ring member one or both of which are ribbed to impart ribs to the parison. The parison may be ribbed internally or externally along its length continuously or intermittently. The parison is located in a blow mold and expanded to form a longitudinally ribbed bottle. Thus, the inside of the finished blow-molded hollow body is provided with reinforcing ribs extending in an axial direction. (Viewed in the circumferential direction, varying wall thicknesses can be molded into the extruded parison.) The ribs might have a uniform or non-uniform depth or angular disposition. This early example of an extrusion system does not permit adjustments such as a progressive increase in the wall thickness of the parison as a function of its length.

In 1981, U.S. Pat. No. 4,257,527 issued to Snyder et al. Snyder et al. teach a drum capable of being molded in 55 gallon (about 208 liters) size from high density, cross-linked polyethylene. The drum body or shell has substantially cylindrical walls closed at both ends, respectively, by top and bottom end pieces or heads integral with the sidewalls. The drum includes an integrally molded hollow arcuate chime located at the intersection of the top end piece or head and the cylindrical sidewall and extending circumferentially around the drum. The drum may be reinforced by a plurality of inwardly protruding vertical ribs which run continuously and substantially from the top to the bottom of the drum. These longitudinal ribs are produced in the blow molding of a parison, having a constant, uniform wall thickness, merely by is providing the blow mold with axial grooves. The thickness of the container wall in the circumferential direction remains unchanged. Where the longitudinal ribs, molded relatively deep into the container wall, transition into the upper and lower perimeter, this configuration causes deep pockets or nests from which highly viscous materials can be removed only with great difficulty, making the drum unsuitable for multiple reuse. Moreover, these transition points at the perimeter constitute structurally weak spots in the event the drum is exposed to a mechanical load.

In 2005, Przytulla et al. taught a method and a device for producing blow-molded plastic hollow bodies. See U.S. Patent Application Publication No. 2005/0037169 (and related U.S. Patent Application Publication No. 2002/0074677 and EP 1 082 204). The extrusion die according to this invention is adjustable (i.e., changing the nozzle and mandrel gap) for different settings to produce different, partly overlapping wall thicknesses of the parison in order to compensate for the insufficiencies inherent in blow molding and to obtain a finished blow-molded product with as consistent and uniform a wall thickness as possible, with an overlay, for instance in vertical wall sections, of evenly spaced longitudinal ribs. A technical concept is introduced whereby two conventional measures used to achieve a uniform wall thickness in the finished blow-molded hollow body are complemented by an additional, third step which makes it possible to produce containers whose hollow bodies are provided with targeted, intentional, and reproducible irregular wall-thickness patterns. Specifically, the containers produced have vertical walls, an essentially horizontal top panel or lid, a corresponding bottom panel, and exclusively on the inside of their vertical walls multiple, mutually spaced ribs, leaving the exterior wall surface uniformly smooth and unchanged. This multiple adjustability of the extrusion (using three, separate adjustment control systems to redirect the single stream of extruded material) is of great significance for large-volume industrial containers, for instance 220-liter ribbed barrels or drums used as fuel tanks in the automotive industry.

Per Przytulla et al., in contrast to other control elements which produce the partly thicker parison sections intended for the highest stress points of the parison by pushing aside plastic material in the nozzle gap for those parison sections which are moved into the mold-parting plane, whereby the displaced material is pushed into the thick-wall sections at a 90 degree angle to the mold-parting plane, the design of the extrusion device according to Przytulla et al. allows a gate valve to be moved upward, freeing up the double-oval profile of a fixed nozzle ring, so that at that point more plastic material can flow (i.e., be redirected) where it is really needed. A lateral displacement over great path lengths has its disadvantages in that the memory effect of the plastic material will negatively affect the straight flow of the parison, causing the cross section of the parison at its starting point to be out of round. When the initial point of the parison is not cleanly fed over the blowing mandrel and the parison-expanding mandrel, it will lead to frequent jamming of the system.

It is further known to add pockets to the die tooling (grooves that are machined into the tooling) to add axial (vertical) ribs of material to weak areas of articles where the plastic is at maximum stretch when blown. The problem with this solution is the axial (vertical) ribs of plastic continue through the entire article including areas where the material is not needed (such as the neck threads and panel). This excess material creates increased complexity in article processing as well as a trade-off in article performance.

To overcome the shortcomings of conventional blow molding machines, a new machine is provided that adds material to certain portions of an article, thereby strengthening the article without affecting the rest of the article. In view of the relatively large commercial demand for various types of blow molded plastic articles, it would be desirable to have a blow molding machine that can produce quickly and at a relatively low cost high-quality articles with minimal material consumption yet increased structural rigidity and strength. The presently disclosed machine satisfies this desire.

An object of the present disclosure is to provide an improved blow molding machine for producing plastic hollow articles, and especially plastic containers which, while retaining their smooth external wall surface and an unchanged (if not lower) operational container weight (i.e., without increasing the net material weight compared to that of a corresponding conventional container), offer greater stacking-load strength especially when filled with hot liquids. A related object is to produce an is article having substantially better resistance to negative pressure conditions. A further related object is to produce an article that, because its exterior wall surface is smooth, permits easy marking or labeling. A still further related object is to produce an article that offers improved environmental stress crack resistance (ESCR) and improved drop test results, as compared to conventionally produced articles, at equal or reduced material requirements (e.g., lightweight).

Another object is to incorporate into an article internal reinforcement axial ribs without otherwise changing the wall thickness of the article. Yet another object is to be able to turn on and off these axial ribs, controlling and defining the extent of the ribs so that the axial (vertical) ribs produced can be of varying length and thickness along the article. A related object is to provide internal reinforcement axial ribs without adding material throughout the entire article adversely affecting the neck of the article.

It is still another object to provide an improved blow molding machine that is relative inexpensive to manufacture. A blow molding machine having components that can be easily and readily retrofitted to existing blow molding machines, such as shuttle type machines or continuous type wheel machines, is yet another object. Related objects are to avoid both (i) the need to modify the blow molds used with the blow molding machine in any way, and (ii) moving parts in the die tooling that controls the material flow. The present disclosure also seeks to change the thickness of the walls of an article independent of the die gap.

It is still another object to avoid difficult setup procedures. An additional object is to provide a control system that coordinates and controls operation of the various components of the blow molding machine. Yet another object is to provide increased control over key parameters during operation of the blow molding machine.

SUMMARY OF THE DISCLOSURE

To achieve these and other objects, to meet these and other needs and desires, and in view of its purposes, the present disclosure is directed to a blow molding machine for producing an article from a plastic parison. The machine has a flow head from which the parison is delivered to a mold, a servo-controlled accumulation technology (or SCAT) unit (or a comparable component), a tooling unit, and a material duct. The SCAT unit includes an accumulator collecting plastic material when in a retracted position and delivering plastic material when in an extended position, and an actuator directing the accumulator to retract and extend. The tooling unit includes a bushing body engaging the flow head, a distribution ring, and a bushing cap. The tooling unit further includes a central aperture defining a main parison flow path and a distribution channel delivering additional plastic material received from the accumulator to the main parison flow path. The material duct connects the SCAT unit and the tooling unit. Plastic material delivered by the SCAT unit is transported through the material duct to, and is received by, the tooling unit.

Also provided is a vertical additive processing system for use with a blow molding machine having a flow head from which a plastic parison is delivered to a mold and producing an article. The system has a servo-controlled accumulation technology (SCAT) unit including (a) an accumulator collecting plastic material when retracted and delivering plastic material when extended, and (b) an actuator directing the accumulator to retract and extend. The system further has a tooling unit including a bushing body adapted to engage the flow head, a distribution ring, a bushing cap, a central aperture defining a main parison flow path, and a distribution channel delivering additional plastic material received from the accumulator to the main parison flow path. The system still further has a material duct connecting the two units through which plastic material delivered by the SCAT unit is transported to and received by the tooling unit.

Still further provided is a method for blow molding, in a mold, a plastic article having one or more vertical material distributions. The method includes the steps of (1) providing a first material source; (2) providing a second material source (which may be the same as or different from the first material source and, in fact, the material provided by the first and second material sources may be the same or different); (3) placing a tooling unit between the second material source and the mold, the tooling unit having a distribution ring with an aperture configured to allow introduction of the first material into the mold, and at least one channel configured to allow introduction of the second material into the mold; (4) introducing the first material from the first material source into the mold; and (5) selectively introducing the second material into the tooling unit to create predetermined vertical material distribution sections in the plastic article.

It is to be understood that both the foregoing general description and the following detailed description are exemplary, but are not restrictive, of the invention.

BRIEF DESCRIPTION OF THE DRAWING

The disclosure is best understood from the following detailed description when read in connection with the accompanying figures. It is emphasized that, according to common practice, the various features of the figures are not to scale. On the contrary, the dimensions of the various features are arbitrarily expanded or reduced for clarity. Included in the drawing are the following figures.

DETAILED DESCRIPTION OF THE EMBODIMENTS

Described below is an improved blow molding machine 10 that incorporates vertical additive processing (VAP) components. The VAP components include, in one embodiment, a servo-controlled accumulation technology (or SCAT) unit and a tooling unit connected via a VAP material duct. The tooling unit combines a distribution ring with an engineered distribution ring or bushing cap (for either converge or diverge tooling). One or more channels are formed in the tooling unit.

Figure 1:
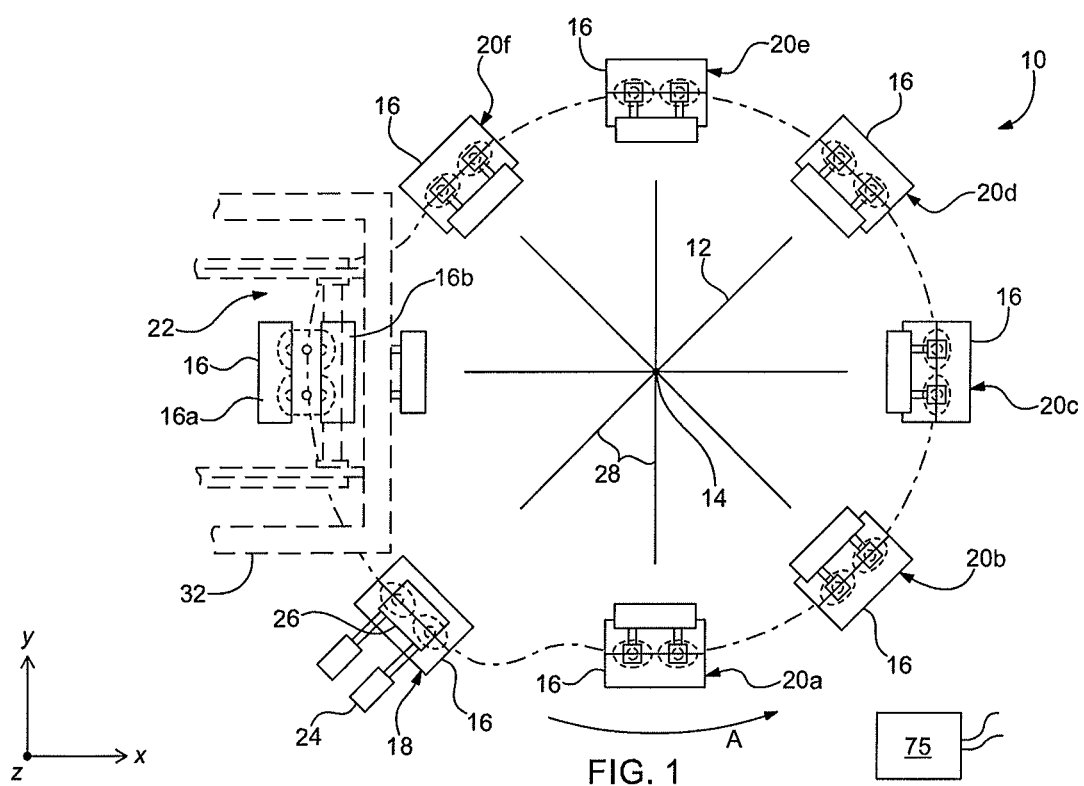
FIG. 1 is a schematic plan view of several of the basic components of an exemplary blow molding machine according to the present invention.

Referring now to the drawing, in which like reference numbers refer to like elements throughout the various figures that comprise the drawing, FIG. 1 shows a schematic plan view of several of the basic components of an exemplary blow molding machine 10. Although a horizontal rotary blow molding machine 10 is illustrated, the VAP components could be incorporated into almost any type of blow molding machine such as shuttle-type machines or vertical wheel machines. The exemplary machine 10 includes a turntable 12 rotatable by an electric motor (not shown) about an axis of rotation 14. The turntable 12 is oriented horizontally (in the x-y plane) and the axis of rotation 14 is substantially vertical (along the z-direction).

One or more molds 16 are mounted on the turntable 12. Counterclockwise rotation of the turntable 12, in the direction of arrow A in FIG. 1, positions each mold 16 successively at a plurality of stations. Among the stations are a first station 18; a plurality of intermediate stations including second station 20a, third station 20b, fourth station 20c, fifth station 20d, sixth station 20e, and seventh station 20f; and a last station 22. The number of stations is equal to the number of molds 16 on the turntable 12, eight in the example illustrated, although more or fewer stations are feasible. Each mold 16 has two mold halves 16a and 16b which can be moved between an open configuration, as shown at the last station 22, and a closed configuration, shown at the first station 18 and the intermediate stations 20a-20f.

The machine 10 also includes an extruder 24 which feeds molten polymer resin to a flow head 26 positioned at the first station 18. (For this reason, the first station 18 can also be called the extrusion station.) Although a wide variety of plastic resin materials can be used, including polypropylene, polyvinylchloride (PVC), and polycarbonate, preferred materials are polyethylene terephthalate (PET) and polyolefin. The flow head 26 is advantageously stationary, meaning that the flow head 26 is fixed in a single, constant position at all times.

The first station 18 is positioned at a predetermined angle 28 relative to the last station 22 as measured with respect to the turntable axis of rotation 14. By "predetermined" is meant determined beforehand, so that the predetermined angle 28 must be determined, i.e., chosen or at least known, before the machine 10 is used. For the example configuration shown in FIG. 1, for which eight stations are provided, the predetermined angle 28 is preferably an acute angle of about 45 degrees. This relative positioning is advantageous because it provides increased cooling time for a molded article as it traverses the large remaining angle (315 degrees in the illustrated example) occupied by the intermediate stations 20a-20f and the last station 22 before being released from the mold 16 at the last station 22. (Because the article is released at the last station 22, the last station 22 can also be called the ejection station.) An article takeout device 32 is positioned at one of the stations (as illustrated in FIG. 1, the takeout station may be the last station 22) for removing articles from the mold 16 after they have cooled and for transporting the articles for further processing, such as de-flashing.

During blow molding processes and, especially, extrusion blow molding processes, flash is often formed along a portion of a parting line of the molded plastic article. The bottom or base of the article may have a "tail" flash, for example, which is the result of clamping the plastic that is extruded between the two mold halves 16a and 16b. In addition, unwanted plastic flash is often attached to the top of the article adjacent to where the threads of the article are formed. If the article has a handle, the section between the handle and the body of the article may also contain a web of plastic material corresponding in thickness to two layers of the original plastic parison. There have been a number of different approaches taken to address the problem of removing flash from blow molded plastic articles.

In order to present the molds 16 to the stationary flow head 26, each mold 16 is mounted on a respective carriage which is movably mounted on a respective inclined ramp. The inclined ramps are mounted on the turntable 12.

Operation of the various components of the machine 10 such as rotating the turntable 12, opening and closing the molds 16, raising and lowering the carriages, accelerating the inclined ramps and their associated carriages and molds 16, and moving the takeout device 32 are controlled and coordinated by a control system 75 shown in FIG. 1. The control system 75 is preferably a microprocessor-based device such as a personal computer (PC) or a programmable logic controller (PLC) which executes resident software controlling the functional operation of the machine 10. Communication between the various machine components and the control system 75 may be by wire, by wireless, or by a combination of both wire and wireless communications. Wireless communications are especially advantageous for controlling components on rotating machinery, such as the turntable 12, because these communications avoid the need for complex rotary contacts to transmit electrical signals across rotary interfaces where components are moving relative to one another. Feedback to the control system 75 is provided by various sensors such as micro switches and optical sensors deployed and positioned as required to provide positional information and other status-related information.

Figure 2:
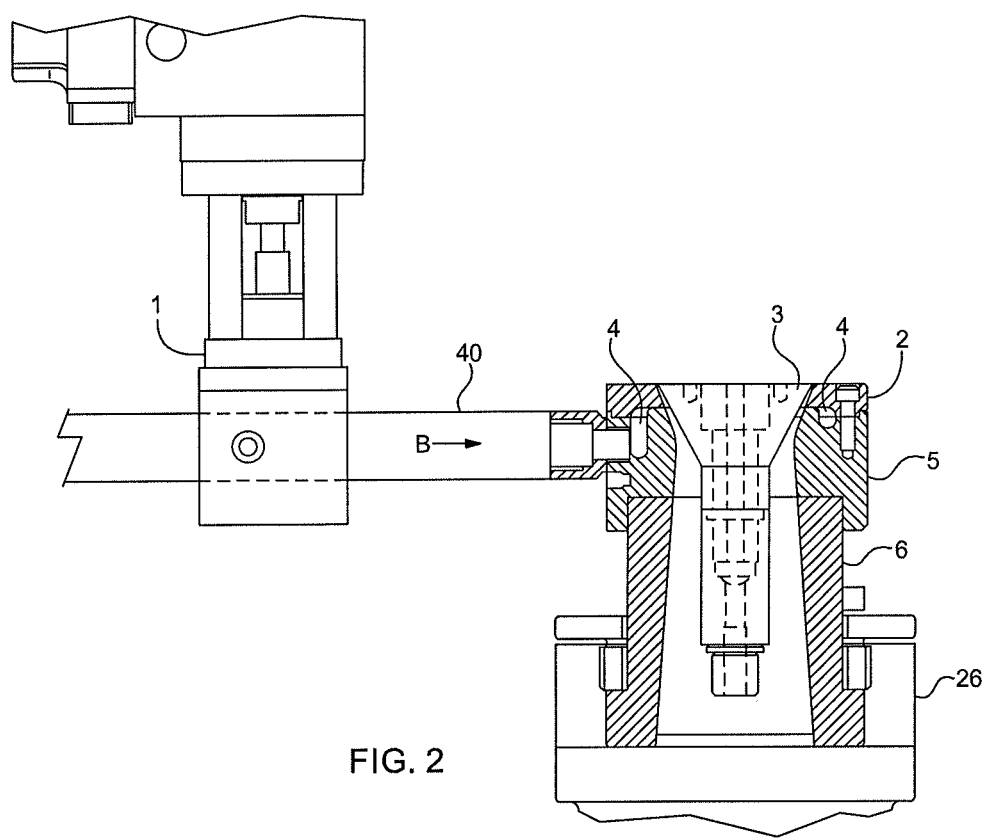
FIG. 2 illustrates one embodiment of vertical additive processing (VAP) components in connection with the flow head of the machine shown in FIG. 1.

FIG. 2 illustrates exemplary VAP components in connection with the flow head 26 of the machine 10. In the embodiment shown, the VAP components include a SCAT unit 8 (highlighted in FIG. 3) and a tooling unit 9 (highlighted in FIGS. 5 and 5A). The SCAT unit 8 is connected to the tooling unit 9 via a VAP material duct 40. A secondary VAP material flow 82 travels from the SCAT unit 8 to the tooling unit 9 in the direction of arrow B in the VAP material duct 40. (This travel is best illustrated in FIGS. 7C and 7D.) Upon reaching the tooling unit 9, the secondary VAP material flow 82 enters the tooling unit 9 at a port 42 formed in the tooling unit 9 and is directed, through a circular distribution duct 43, to one or more distribution channels 4 formed in the tooling unit 9.

Figure 4:
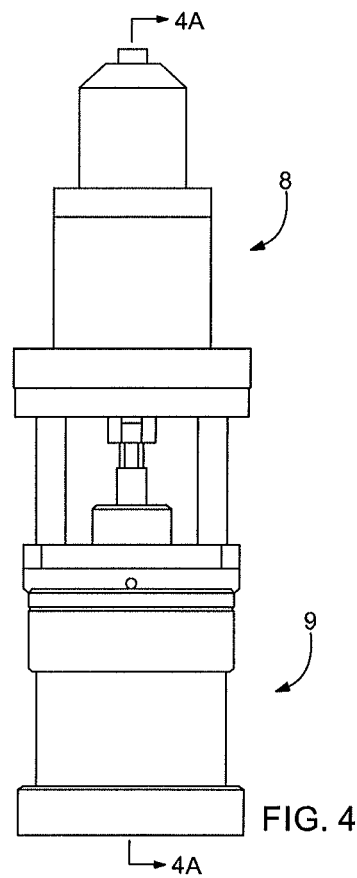
FIG. 4 is a front view of the exemplary VAP components.
Figure 4A:
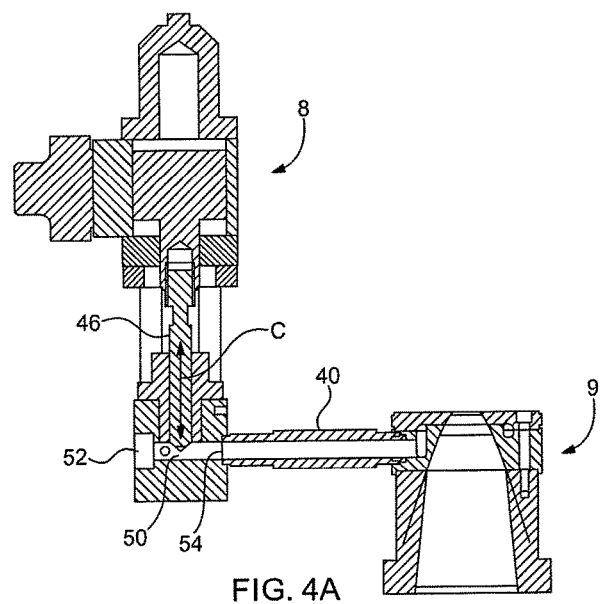
FIG. 4A is a cross-section view of the exemplary VAP components taken along the line A-A of FIG. 4.
Figure 4B:
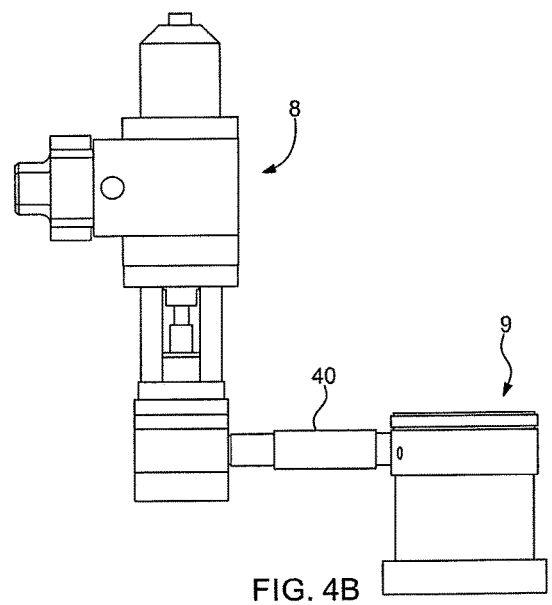
FIG. 4B is a side view of the exemplary VAP components.

FIG. 4 is a front view of the exemplary VAP components. FIG. 4A is a cross-section view of the exemplary VAP components taken along the line A-A of FIG. 4. FIG. 4B is a side view of the exemplary VAP components.

Figure 3:
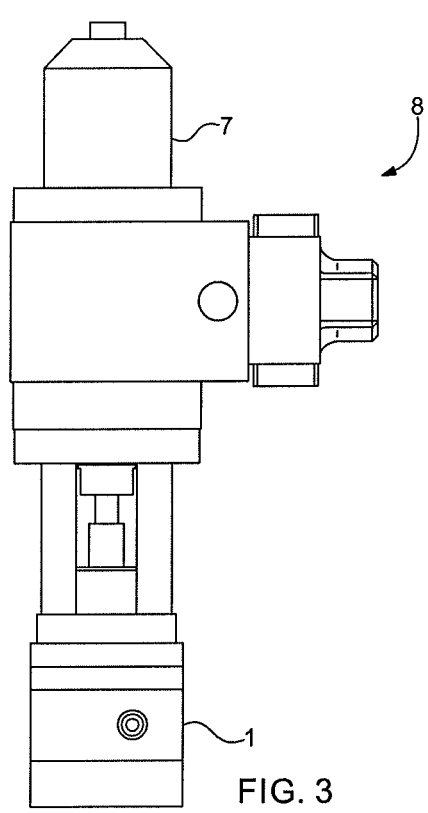
FIG. 3 highlights the servo-controlled accumulation technology (or SCAT) unit, one of the exemplary VAP components.

As highlighted in FIG. 3, the SCAT unit 8 includes an accumulator 1 and an actuator 7. Because the flow of plastic through the distribution channel 4 is continuous, the SCAT unit 8 is used to accumulate or collect the secondary VAP material flow 82 for times when the application does not want the axial (vertical) ribs to be applied to the parison (formed by a main parison flow 80) then reverse direction and inject the secondary VAP material flow 82 at a precisely controlled rate for either continuous or varying thickness. The accumulator 1 of the SCAT unit 8 has a piston rod 46 that can travel back-and-forth along the direction of arrow C in FIG. 4A, retracting to accumulate the secondary VAP material flow 82 or extending to push the secondary VAP material flow 82 through the VAP material duct 40 to the tooling unit 9. FIG. 4A depicts the piston rod 46 in the fully extended position.

The secondary VAP material flow 82 enters the accumulator 1 at the inlet 52, passes through the connection 50, and leaves the accumulator 1 at the outlet 54. Upon leaving the accumulator 1 through the outlet 54, the secondary VAP material flow 82 enters the VAP material duct 40. Although the actuator 7 can be hydraulic, a servo-controlled actuator 7 is preferred because it enables proprietary controls for precise repeatability. The figures depict a servo-controlled actuator 7. The actuator 7 may be controlled by the control system 75.

Thus, the accumulator 1 forces the secondary VAP material flow 82 into the tooling unit 9 for use in reinforcing specific parts of an article formed by the blow molding machine 10. The accumulator 1 extends, upon direction of the actuator 7, to deliver all of the secondary VAP material flow 82 to the VAP material duct 40. The accumulator 1 retracts, also upon direction of the actuator 7, acting like a vacuum to direct at least some of the secondary VAP material flow 82 away from the connection 50 and, thereby, to stop delivering at least some of the secondary VAP material flow 82 to the VAP material duct 40.

Rather than add the secondary VAP material flow 82 into the tooling unit 9 and ultimately to a molded article, the SCAT unit 8 can be used to remove material from specific locations of that article. Such removal occurs upon direction of the control system 75. Specifically, the control system 75 can direct retraction of the actuator 7 with sufficient speed to exceed the rate at which material is supplied to the SCAT unit 8. Material is then removed (sucked) from a specific area on the article.

The SCAT unit 8 may be servo-controlled (as described above, using a programmable accumulator 1 and a servo-controlled actuator 7) or hydraulically, pneumatically, or electrically driven. Although the SCAT unit 8 has been identified for selectively controlling the secondary VAP material flow 82, other components could also be used instead to achieve that function. Examples of suitable alternative components for the SCAT unit 8 are a reciprocating injection screw (which pushes material, accumulates material, pulls back, then again pushes material), a melt pump (which can be turned on and off at specific points in the process), or any other technology that can turn, push, and pull material.

Figure 5:
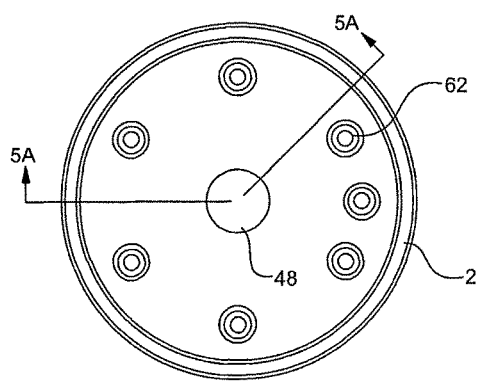
FIG. 5 is a top view of the tooling unit, another of the exemplary VAP components.
Figure 5A:
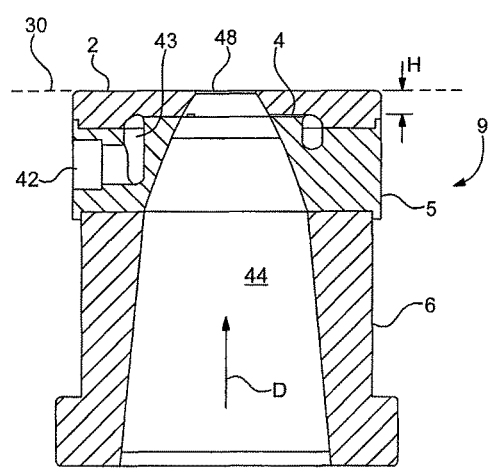
FIG. 5A is a cross-section view of the tooling unit taken along the line A-A of FIG. 5.

FIG. 5 is a top view of the tooling unit 9. FIG. 5A is a cross-section view of the tooling unit 9 taken along the line A-A of FIG. 5. The tooling unit 9 combines a bushing cap 2, which defines a top plane 30, with a distribution ring 5 and a bushing body 6. As shown in FIG. 5A, the distribution ring 5 defines the port 42 and a portion of the distribution duct 43. The distribution ring 5 is mounted between the bushing body 6 and the bushing cap 2. The bushing cap 2, distribution ring 5, and bushing body 6 combine to define a central aperture 44. As shown in FIG. 2, the bushing body 6 of the tooling unit 9 engages (directly or indirectly) the flow head 26 of the machine 10.

FIG. 2 also shows the diverge pin 3 formed in the bushing cap 2. The configuration of the diverge pin 3, namely a frustro-conical configuration with sidewalls that taper inwardly from a circular top to a circular bottom surface, and its operation are conventional and known to those skilled in the art of blow molding machines. See, for example, U.S. Pat. No. 5,865,338 issued to Conn.

Figure 6:
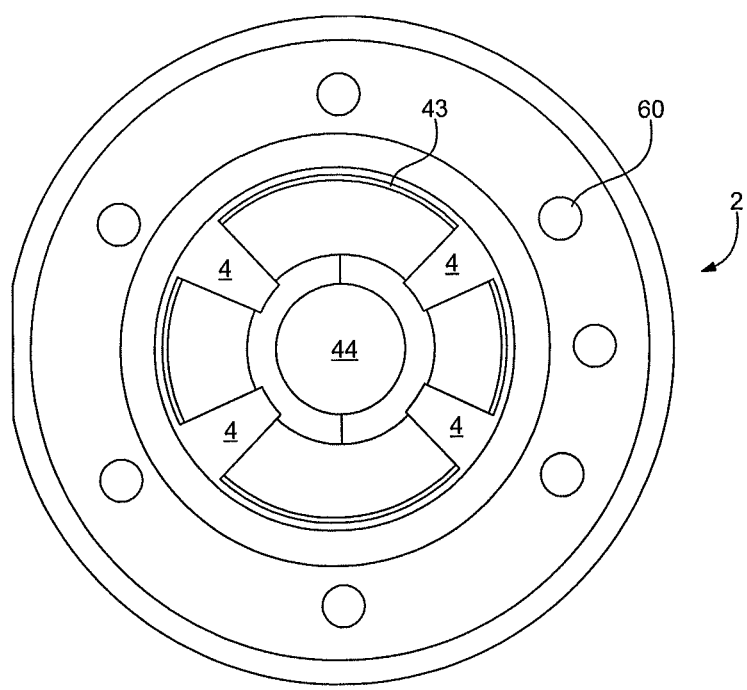
FIG. 6 is a bottom view of the bushing cap of the tooling unit.

The distribution duct 43 and one or more distribution channels 4 are formed (preferably machined) in the tooling unit 9. Specifically, first portions of the distribution duct 43 and of the one or more distribution channels 4 are formed in the distribution ring 5 and mating portions of the distribution duct 43 and of the one or more distribution channels 4 are formed in the bushing cap 2. The first portions of the distribution duct 43 and of the one or more distribution channels 4 formed in the distribution ring 5 work in conjunction with the mating portions of the distribution duct 43 and of the one or more distribution channels 4 formed in the bushing cap 2. The number of distribution channels 4 and their location can vary depending upon the application. For example, a single distribution channel 4 is suitable. As shown in FIGS. 5A and 6, four distribution channels 4 are formed in the bushing cap 2 and in the distribution ring 5. The distribution channels 4 deliver the secondary VAP material flow 82 to the parison, adding material to the main parison flow 80 which travels the main parison flow path defined by the direction arrow D through the central aperture 44. Thus, the distribution channels 4 direct the secondary VAP material flow 82 to strategic areas on the article. For reasons discussed below, the distance or height H that the distribution channels 4 are located below the plane 30 is very important.

FIG. 6 is a top view of the bushing cap 2 of the tooling unit 9. The bushing cap 2 is the segment of the tooling unit 9 where the parison exits the tooling unit 9, namely through the opening 48 formed in the bushing cap 2, and is positioned between the mold halves 16a and 16b. As mentioned above, mating portions of the distribution duct 43 and of the distribution channels 4 are formed (preferably machined) in the bushing cap 2. The four distribution channels 4 are not spaced equally around the circumference of the distribution duct 43 in the embodiment illustrated in FIG. 6. Rather, the four distribution channels 4 comprise two pair of distribution channels 4, the distribution channels 4 of each pair separated by about 70 degrees and the pairs separated by about 110 degrees. Also shown in FIG. 6 are a plurality of holes 60 adapted to receive fasteners 62 (see FIG. 5). Although other fasteners 62 are envisioned, bolts are suitable as exemplary fasteners 62. A threaded engagement between and among components is possible as an alternative to fasteners 62.

The fasteners 62 are used to connect the bushing cap 2 to the distribution ring 5 (and, in some embodiments, the bushing cap 2, the distribution ring 5, and the bushing body 6). The fasteners 62 are designed in type, number, and location to create a seal between the bushing cap 2 and the distribution ring 5 (and, in some embodiments, among the bushing cap 2, the distribution ring 5, and the bushing body 6). The seal prevents the parison material from exiting the tooling unit 9 other than through the opening 48 formed in the bushing cap 2.

As depicted in FIG. 5A, each of the bushing cap 2, the distribution ring 5, and the bushing body 6 are separate components that are mated or engaged to form the tooling unit 9. In other embodiments, two or all three of the bushing cap 2, the distribution ring 5, and the bushing body 6 may be formed as integral structures. Thus, the bushing cap 2 and the distribution ring 5 may be formed as an integral structure which is mated or engaged with the bushing body 6 to form the tooling unit 9. Alternatively, all three of the bushing cap 2, the distribution ring 5, and the bushing body 6 may be formed as a single, integral structure. By "integral" is meant a single structure or a single unitary structure that is complete by itself without additional pieces or the need for connection to form the structure, i.e., the structure is of one monolithic piece.

It is envisioned that the tooling unit 9 will be removed from the machine 10 periodically for various reasons. Therefore, the embodiment having each of the bushing cap 2, the distribution ring 5, and the bushing body 6 as separate components may be advantageous over an integral tooling unit 9. Removal of at least some components of the tooling unit 9 may be required to change the tooling unit 9 to produce a particular article having pre-determined characteristics. Other reasons, such as maintenance, might also prompt removal of at least certain components of the tooling unit 9.

The blow molding machine 10 including the SCAT unit 8 and the tooling unit 9 (the VAP components) adds material to an extruded parison at specific locations in the form of vertical lines or points. The blow molding machine 10 creates programmable vertical lines to increase the strength of the article without affecting the rest (especially the neck) of the article. Material can be added to corners of the molds where stretching of the parison is maximum without affecting the rest of the article. In addition, the blow molding machine 10 can turn the added material on and off with the use of the control system 75.

The blow molding machine 10 including the VAP components adds material, and thereby thickness, to a targeted location on the molded article. By using multiple VAP components, multiple entry locations, or both for a single article, material can be added to multiple locations around the perimeter of the article at varying heights. VAP material may be applied for aesthetics, for example, adding a stripe (partial, full, or segmented) for product SKU identification. The VAP components can also add VAP material for improved performance above mechanical strength, for example, soft touch material in a specific location on the article for gripping.

Figure 7A:
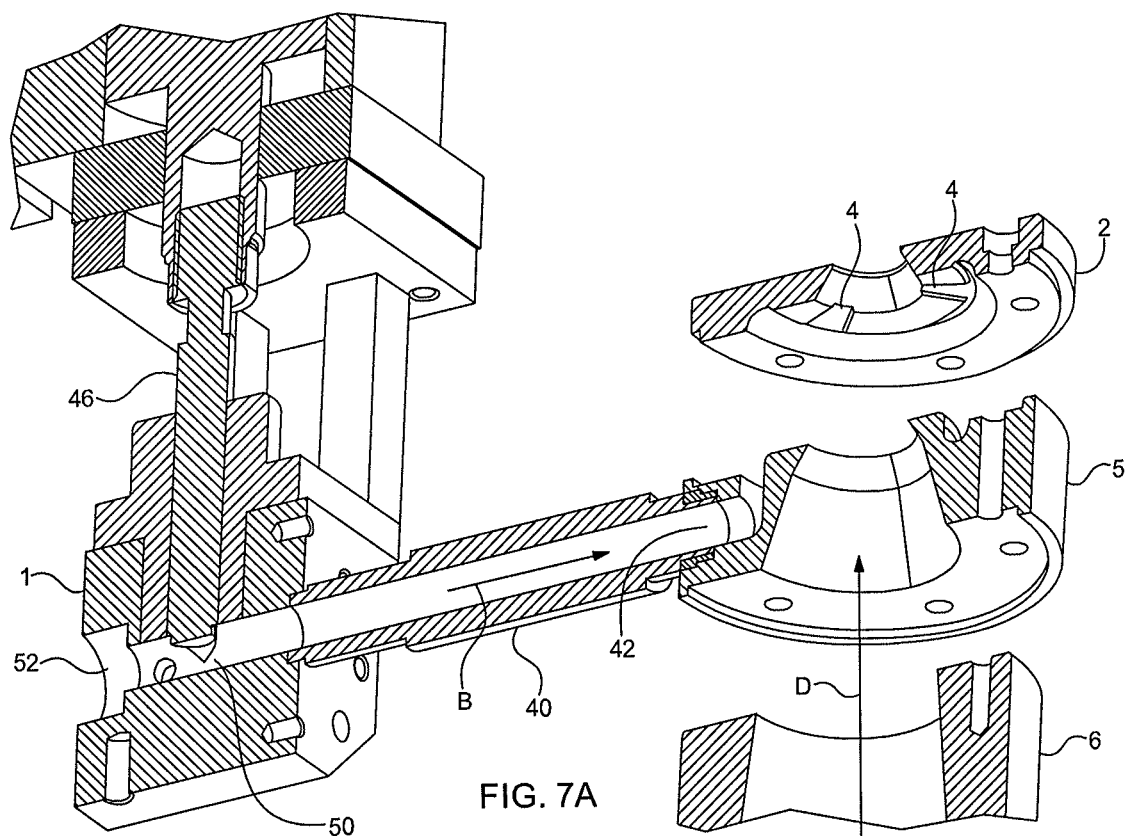
FIG. 7A is bottom perspective view, in cross section, of the exemplary VAP components illustrating both the main parison flow path and the secondary VAP material flow path.
Figure 7B:
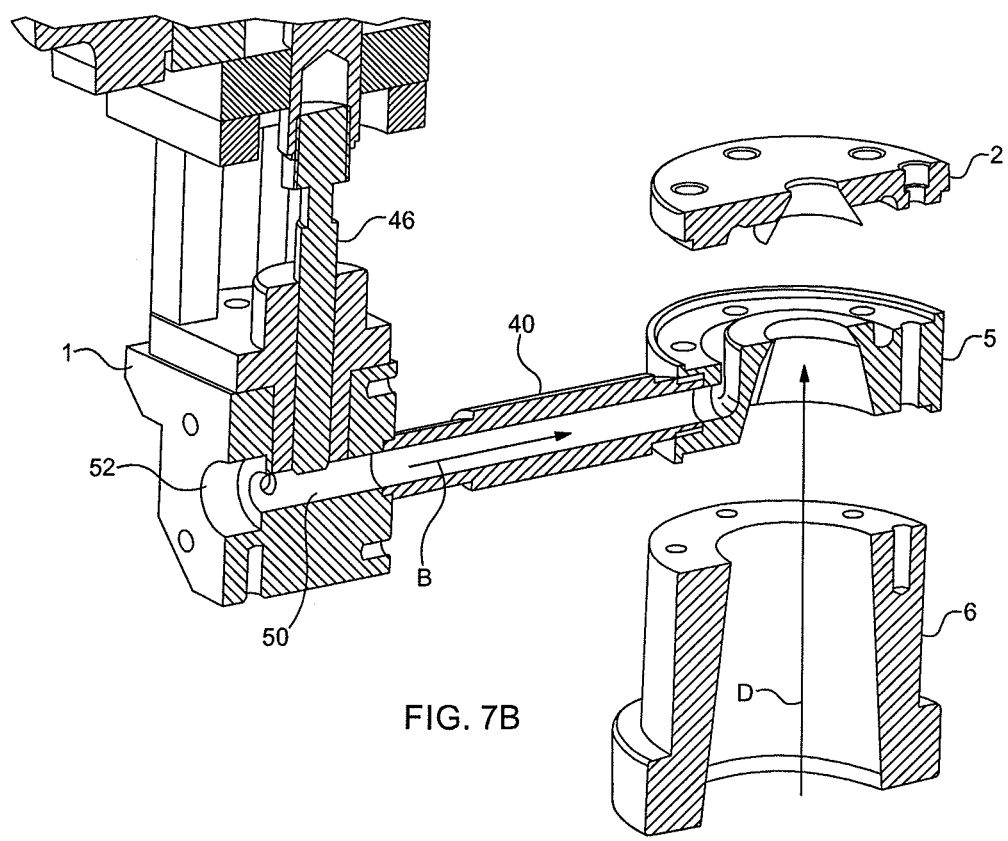
FIG. 7B is top perspective view, in cross section, of the exemplary VAP components illustrating both the main parison flow path and the secondary VAP material flow path.
Figure 7C:
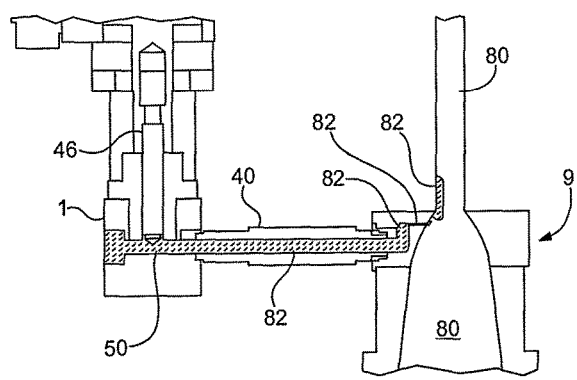
FIG. 7C is a schematic illustration of the VAP material being introduced to the main parison.
Figure 7D:
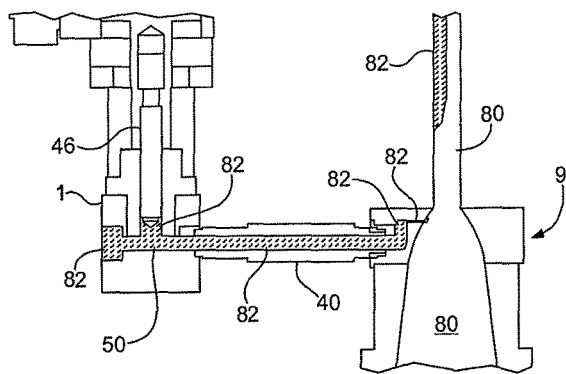
FIG. 7D is a schematic illustration of the interruption of the VAP material flow.

FIG. 7A is bottom perspective view and FIG. 7B is top perspective view, each in cross section, of the exemplary VAP components illustrating both the main (or primary) parison flow path and the secondary VAP material flow path. As shown, the main parison flow 80 arrives in the bushing body 6 from the flow head 26 and travels along the direction of arrow D (defining the main parison flow path) through the distribution ring 5 and the bushing cap 2 of the tooling unit 9. The secondary VAP material flow 82 travels, in the direction of arrow B (defining the secondary VAP material flow path), from the accumulator 1 of the SCAT unit 8 to the distribution ring 5 of the tooling unit 9 via the VAP material duct 40. The secondary VAP material flow 82 enters the distribution ring 5 through the port 42 and is directed through the distribution duct 43 to the distribution channels 4, from which the secondary VAP material flow 82 is delivered to the main parison flow 80.

FIG. 7C is a schematic illustration of the secondary VAP material flow 82 being introduced to the main parison flow 80 as the secondary VAP material flow 82 exits the distribution channels 4 of the bushing cap 2 of the tooling unit 9. FIG. 7C depicts the piston rod 46 of the accumulator 1 in its fully extended position, pushing the secondary VAP material flow 82 through the VAP material duct 40 to the tooling unit 9. FIG. 7D is a schematic illustration of the interruption of the secondary VAP material flow 82. FIG. 7D depicts the piston rod 46 of the accumulator 1 in its fully retracted position, pulling at least some of the secondary VAP material flow 82 from the connection 50 as it retracts. This diversion of the secondary VAP material flow 82 from the connection 50 results in less of the secondary VAP material flow 82 entering the VAP material duct 40 and, in turn, an interruption in the addition of the secondary VAP material flow 82 to the main parison flow 80.

The VAP material that forms the secondary VAP material flow 82 may be the same as, similar to, or different from the material that forms the main parison flow 80. For example, the main parison flow 80 might be high density polyethylene and the secondary VAP material flow 82 might be low density polyethylene or polypropylene. In addition, the material that forms the main parison flow 80 and the material that forms the secondary VAP material flow 82 may come from the same or a different source (i.e., extruder). If a single extruder is used to supply both the main parison flow 80 and the secondary VAP material flow 82, a flow diverter (with or without a choke) can be provided.

Figure 8A:
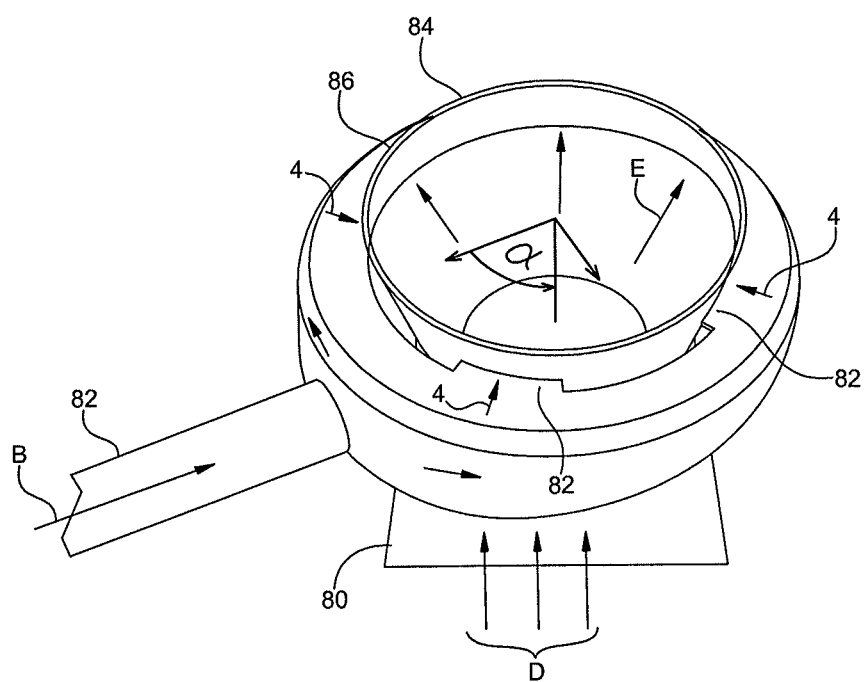
FIG. 8A is a schematic plastic flow model illustrating the main parison flow and the secondary VAP material flow joining to form a combined flow.
Figure 8B:
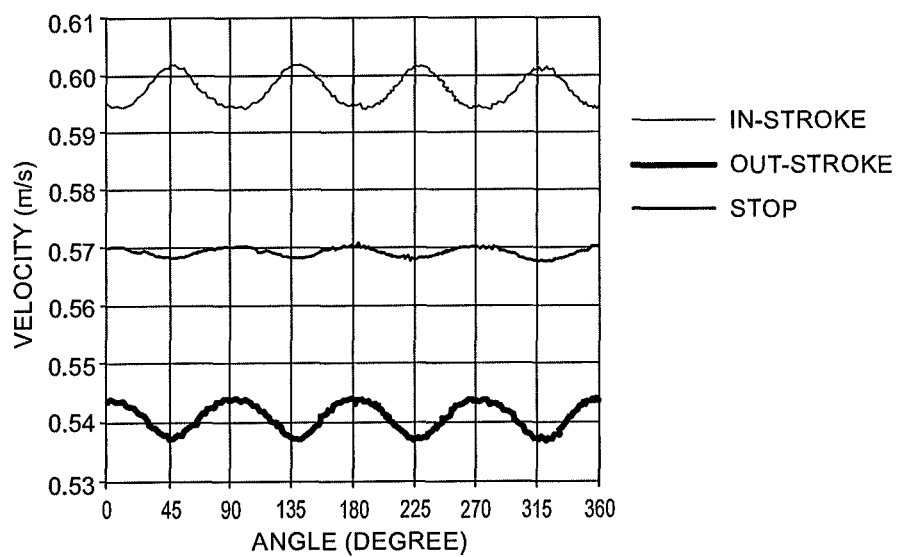
FIG. 8B is a graph depicting the velocity of the combined flow shown in FIG. 8A around the circumference (i.e., at various angles alpha from zero to 360 degrees) of the aperture in the bushing cap as the combined flow exits the bushing cap.

FIGS. 8A and 8B combine to illustrate another alternative embodiment of the blow molding machine 10, focusing on the velocities of a combined flow 84 (which includes the main parison flow 80 and the secondary VAP material flow 82 after the latter has been added to the former) as the combined flow 84 exits the bushing cap 2 through the aperture 44. FIG. 8A is a schematic plastic flow model showing the main parison flow 80 arriving in the direction of arrows D and the secondary VAP material flow 82 arriving in the direction of arrow B. The secondary VAP material flow 82 is directed by the distribution duct 43 around the aperture 44 and by the distribution channels 4 towards the main parison flow 80. As illustrated in this embodiment, the distribution channels 4 are spaced equidistant, i.e., each distribution channel 4 is 90 degrees from the adjacent distribution channels 4, around the circumference of the tooling unit 9. The angle alpha (α) shows the locations of the four distribution channels 4 at 45, 135, 225, and 315 degrees around the circumference. The combined flow 84 exits the bushing cap 2 in the direction of arrows E.

With reference to FIG. 8A, FIG. 8B is a graph depicting the velocity of the combined flow 84 in the middle of the flow and around the circumference of the aperture 44 as the combined flow 84 exits the bushing cap 2 (e.g., at the location 86 of the velocity test). Using typical convention, the velocity is shown on the ordinate and the angle alpha is shown on the abscissa (the abscissa and the ordinate are the horizontal and vertical axes, respectively, typically the x-axis and the y-axis, of a two-dimensional graph). FIG. 8B shows that the distribution channels 4 correspond to velocity changes at the exit of the bushing cap 2. Peaks in velocity occur at the distribution channels 4, where the secondary VAP material flow 82 has joined the main parison flow 80 to form the combined flow 84, and valleys in velocity occur at the points half-way between adjacent distribution channels 4. These peaks and valleys correspond to increases and decreases in the thickness of the parison formed by the combined flow 84.

The top curve shown in FIG. 8B depicts the velocity of the combined flow 84 when the piston rod 46 of the accumulator 1 in its fully extended position (in-stroke), pushing the secondary VAP material flow 82 through the VAP material duct 40 to the tooling unit 9, as shown in FIG. 7C. The pressure exerted on the secondary VAP material flow 82 increases the overall velocity of the combined flow 84, but more so proximate the distribution channels 4 than elsewhere. The bottom curve shown in FIG. 8B depicts the velocity of the combined flow 84 when the piston rod 46 of the accumulator 1 in its fully retracted position (out-stroke), pulling at least some of the secondary VAP material flow 82 through the VAP material duct 40 from the tooling unit 9, as shown in FIG. 7D. The vacuum exerted on the secondary VAP material flow 82 decreases the overall velocity of the combined flow 84, but more so proximate the distribution channels 4 than elsewhere. The middle curve shown in FIG. 8B depicts the velocity of the combined flow 84 when the piston rod 46 of the accumulator 1 stops, so that the secondary VAP material flow 82 is neither added to nor sucked away from the combined flow 84. Therefore, the velocity of (and pressure on) the combined flow 84 is substantially constant all around the circumference (at any angle alpha) of the aperture 44 of the bushing cap 2. The velocity averages just below 0.57 m/sec for the embodiment shown.

The entry point with respect to the top of the tooling unit 9 of the secondary VAP material flow 82 through the distribution channels 4 and into the main parison flow 80 is very important. Thus, the height H that the distribution channels 4 are located below the plane 30 is very important. If the height H is too large such that the entry point is too low, the velocity and pressure differentials will have time to stabilize, negating the effectiveness of the secondary VAP material flow 82. Specifically, given the memory of the plastic material, if the height H is too large then the effect of adding the secondary VAP material flow 82 to the main parison flow 80 is undermined and, at some height H, virtually no effect on the main parison flow 80 will be exhibited despite the addition of the secondary VAP material flow 82.

On the other hand, if the height H is small, then the tooling unit 9 will have only a small structural layer (having the height H) between the distribution channels 4 and the top of the tooling unit 9. The relatively high pressures experienced by the tooling unit 9 risk warping that small structural layer of the tooling unit 9. And the extreme where the height H is zero, such that there is no structural layer between the distribution channels 4 and the top of the tooling unit 9 (i.e., the distribution channels 4 are flush with the top of the tooling unit 9 and lie in the plane 30), risks negatively impacting the die gap.

Figure 9:
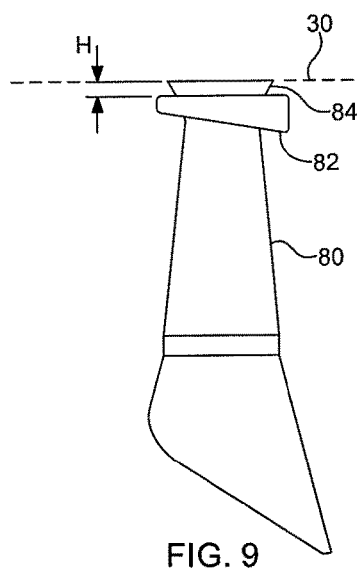
FIG. 9 is a schematic plastic flow model illustrating the main parison flow and the secondary VAP material flow joining to form the combined flow, highlighting the distance from the outlet of the tooling unit to the point where the secondary VAP material flow joins the main parison flow to form the combined flow.

The height H that the distribution channels 4 are located below the plane 30 in the tooling unit 9 corresponds to the distance from the outlet of the tooling unit 9 to the point where the secondary VAP material flow 82 joins the main parison flow 80 to form the combined flow 84. FIG. 9 is a schematic plastic flow model illustrating the main parison flow 80 and the secondary VAP material flow 82 joining to form the combined flow 84. FIG. 9 highlights the distance (or the height H) from the outlet of the tooling unit 9 (which lies in the plane 30 at the top of the tooling unit 9) to the point where the secondary VAP material flow 82 joins the main parison flow 80 (through the distribution channels 4) to form the combined flow 84.

Figure 9A:
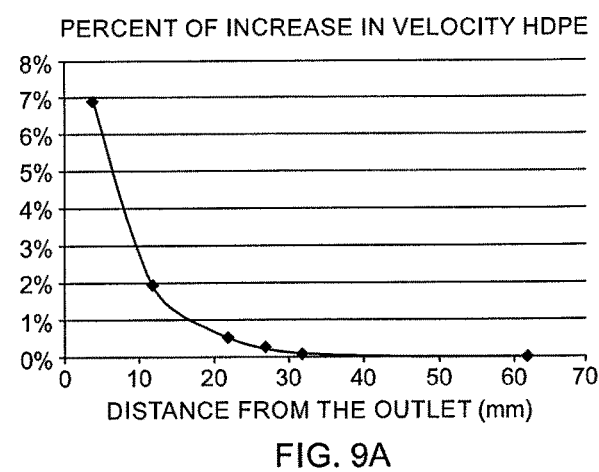
FIG. 9A is a graph illustrating the percent of increase in velocity for the combined flow depending on the distance from the outlet of the tooling unit to the point where the secondary VAP material flow joins the main parison flow to form the combined flow when the flows are high-density polyethylene.
Figure 9B:
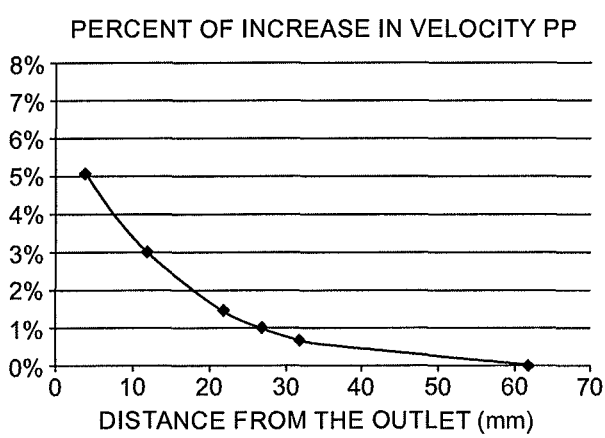
FIG. 9B is a graph illustrating the percent of increase in velocity for the combined flow depending on the distance from the outlet of the tooling unit to the point where the secondary VAP material flow joins the main parison flow to form the combined flow when the flows are polypropylene.

FIGS. 9A and 9B depict the influence of the height H on the efficiency of the addition of the secondary VAP material flow 82 to the main parison flow 80. The efficiency is measured by the velocity increase between the main parison flow 80 (before the secondary VAP material flow 82 is added) and the combined flow 84 (after the secondary VAP material flow 82 is added to the main parison flow 80). The percent of velocity increase is calculated as (maximum velocity minus minimum velocity) divided by minimum velocity times 100.

FIG. 9A is a graph illustrating the percent of increase in velocity for the combined flow 84 depending on the distance (the height H) from the outlet of the tooling unit 9 to the point where the secondary VAP material flow 82 joins the main parison flow 80 to form the combined flow 84 when all of the flows are high-density polyethylene. FIG. 9B is a graph illustrating the percent of increase in velocity for the combined flow 84 depending on the distance (the height H) from the outlet of the tooling unit 9 to the point where the secondary VAP material flow 82 joins the main parison flow 80 to form the combined flow 84 when all of the flows are polypropylene. FIGS. 9A and 9B both show the advantages of minimizing the height H on the efficiency of the addition of the secondary VAP material flow 82 to the main parison flow 80. In one particular embodiment, the preferred height H is selected from the range of about 4-20 mm; in another embodiment, about 4-12.5 mm; and in another embodiment, about 4-20 mm.

The optimal height H will vary, of course, depending on the size of the tooling unit 9, the types of materials used for the secondary VAP material flow 82 and the main parison flow 80, the material flow rates and pressures, and other factors. The entry point of the distribution channels 4 (and, therefore, of the VAP material flow 82) needs to be at a location with respect to the plane 30 and the aperture 44 to create velocity and pressure differentials at the outlet of the tooling unit 9 around the circumference of the aperture 44 (i.e., the exit of the combined flow 84, which is in the plane 30, from the tooling unit 9) which in turn increase the thickness of the parison in the location of this higher pressure and velocity.

Figure 10A:
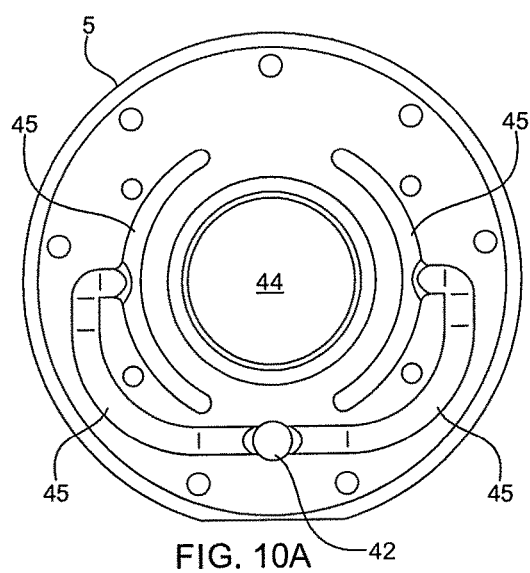
FIG. 10A is a top view of the distribution ring in an alternative embodiment of the tooling unit illustrating a runner.
Figure 10B:
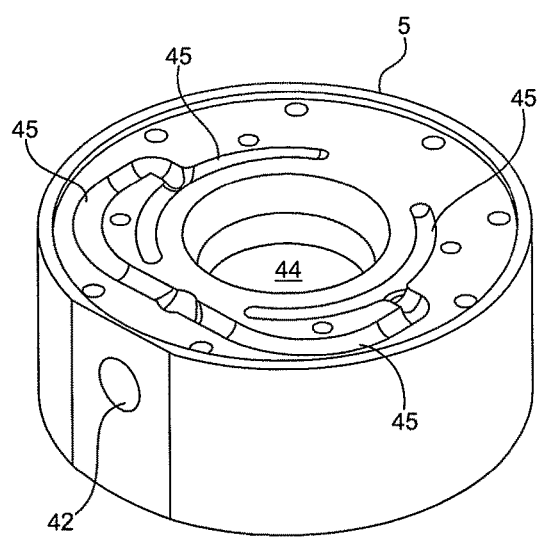
FIG. 10B is a top, perspective view of the distribution ring shown in FIG. 10A.
Figure 10C:
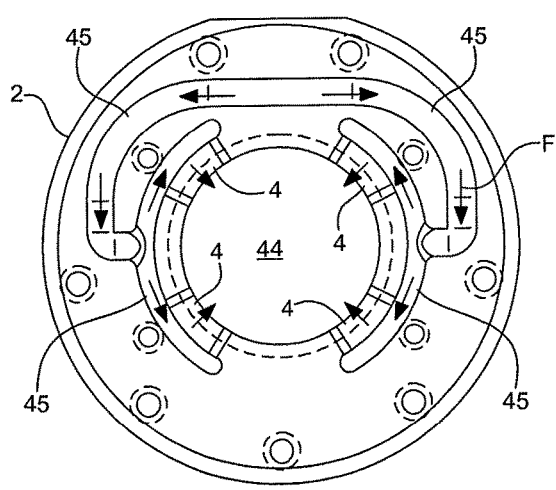
FIG. 10C is a top view of the bushing cap in an alternative embodiment of the tooling unit adapted to mate with the distribution ring shown in FIGS. 10A and 10B.
Figure 10D:
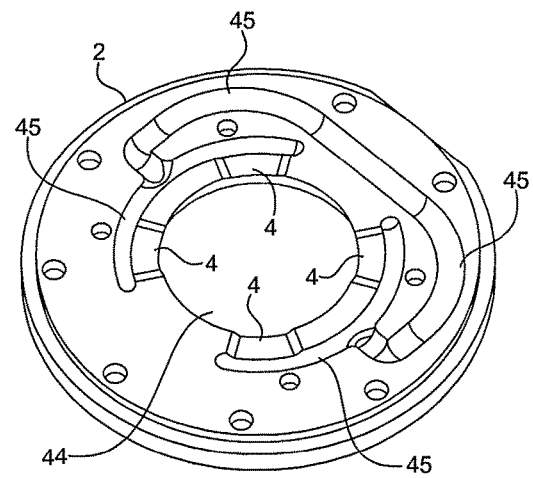
FIG. 10D is a top, perspective view of the bushing cap shown in FIG. 10C.

FIGS. 10A, 10B, 10C, and 10D illustrate an alternative embodiment of the tooling unit 9 and, more specifically, of the distribution ring 5 and the bushing cap 2. FIG. 10A is a top view of the distribution ring 5; FIG. 10B is a top, perspective view of the distribution ring 5 shown in FIG. 10A; FIG. 10C is a top view of the bushing cap 2 adapted to mate with the distribution ring 5 shown in FIGS. 10A and 10B; and FIG. 10D is a top, perspective view of the bushing cap 2 shown in FIG. 10C. Rather than the distribution duct 43 formed in the distribution ring 5 and in the bushing cap 2 as before, the embodiment shown in FIGS. 10A, 10B, 10C, and 10D has a distribution runner 45. Like the distribution duct 43, the distribution runner 45 connects the port 42 to the distribution channels 4 and delivers the secondary VAP material flow 82 from the port 42 to the distribution channels 4.

The distribution duct 43 is essentially circular and surrounds the aperture 44. One disadvantage of the distribution duct 43 is that the secondary VAP material flow 82 is delivered from the port 42 first to the distribution channels 4 located closer to the port 42 and only later in time to the distribution channels 4 located farther from the port 42. In contrast, the geometry of the distribution runner 45 allows the distribution runner 45 to inject the secondary VAP material flow 82 in the direction of arrows F into all four distribution channels 4 at the same time (simultaneously) and, therefore, to achieve a more balanced velocity and pressure distribution.

As shown in FIGS. 10A, 10B, 10C, and 10D, the geometry of the distribution runner 45 defines a substantially U-shaped outer portion (closer to the perimeter of the tooling unit 9 and farther from the aperture 44) that frames about half of the aperture 44 and two mirror-image, substantially semi-circular inner portions located on opposite sides of the aperture 44. The inner portions of the distribution runner 45 are located farther from the perimeter of the tooling unit 9 and closer to the aperture 44 than is the outer portion. The outer portion of the distribution runner 45 connects directly to the port 42 at its center; each of the inner portions connect directly to two of the four distribution channels 4. Each end of the outer portion connects directly to one of the inner portions at the center of the inner portion, about half way between the two distribution channels 4. Thus, the inner and outer portions of the distribution runner 45 are interconnected to form an integral distribution runner 45 and a closed path for the secondary VAP material flow 82.

Another difference between the earlier-disclosed embodiment having the distribution duct 43 and the distribution channels 4 and the embodiment having the distribution runner 45 and the distribution channels 4 is the placement of those components in the tooling unit 9. Specifically, in the earlier-disclosed embodiment, first portions of the distribution duct 43 and of the one or more distribution channels 4 are formed in the distribution ring 5 and mating portions of the distribution duct 43 and of the one or more distribution channels 4 are formed in the bushing cap 2. In contrast, for the embodiment illustrated in FIGS. 10A, 10B, 10C, and 10D, first portions of the distribution runner 45 are formed in the distribution ring 5 and mating portions of the distribution runner 45 are formed in the bushing cap 2 (as for the distribution duct 43), but the distribution channels 4 are formed entirely in the bushing cap 2.

The blow molding machine 10 including the SCAT unit 8 and the tooling unit 9 offers several advantages over conventional tooling designs such as the designs discussed in the Background section. Many conventional designs change the thickness of the article by adjusting the die gap. For example, Przytulla et al. create thicker axial regions by opening and closing a die gap, forcing material to be re-positioned from a single material stream. The blow molding machine 10 does not alter the die gap; rather, the blow molding machine 10 introduces new (additional) VAP material to strategic areas of the article radially and intermittently axially. Both approaches attempt to put material into strategic areas of the article. They differ significantly, however, because Przytulla et al. re-directs a single material stream with a movable die gap whereas the blow molding machine 10 introduces a second material stream through a fixed die gap. The blow molding machine 10 avoids the complex and modified die components needed to create a movable die gap.

The blow molding machine 10 utilizes the fact that plastic has memory. Specifically, the plastic parison has memory and wants to return to its natural state once it exits the flow head 26. This characteristic allows the blow molding machine 10 to change the thickness of the parison independent of the die gap.

The blow molding machine 10 uses the separate distribution channel 4 for VAP plastic material flow to add axial (vertical) ribs of material to strategic areas on the parison. Because plastic has memory, the areas where the plastic is injected through the distribution channel 4 maintain their thickness independent of the final die gap opening. The characteristics of the strategic areas are determined by the tooling unit 9. Thus, the tooling unit 9 is engineered to accommodate each particular application.

The added distribution channel 4 for plastic flow is metered onto the parison via the servo-controlled accumulator 1. The servo-controlled accumulator 1 allows the blow molding machine 10 to shut off the axial ribs of plastic in areas where such added material is not wanted such as, but not limited to, the neck threads. The SCAT unit 8 also allows the blow molding machine 10 to vary the thickness of the axial ribs while being applied in the desired areas of the article. The axial (vertical) ribs produced by the blow molding machine 10 can be of varying thickness throughout the length of the article.

When blow molding certain article shapes, there are some instances where the shape of the article causes the parison to stretch which results in thin spots at certain locations. To account for this stretch, the conventional tooling on the flow head 26 is sometimes designed with an oval shape at the output of the tooling. Although the oval shape accounts for some of the thin spots on the article, it also draws material from other critical areas on the article. The blow molding machine 10 can be used on various shaped articles to add material to those specific thin spots. This ability can also eliminate the need for oval-shaped tooling and allow for basic round tooling to be used. (In this regard, note that the SCAT unit 8 and the tooling unit 9 can be used to retrofit an existing blow molding machine as well as be incorporated in a new blow molding machine as original components.) Where the oval tooling would allow material to be thicker in the critical areas, the blow molding machine 10 performs the same function.

The blow molding machine 10 only uses one nozzle/mandrel-gap control element for parison thickness programming, which makes the processing much simpler. The blow molding machine 10 can be implemented on multiple blow molding machines such as shuttle type machines or continuous type wheel machines. The blow molding machine 10, with its VAP components, also simplifies the conventional complicated die tooling opening process window.

The blow molding machine 10 targets smaller blow-molded articles, such as containers or canisters having a log that weighs less than 500 grams, which run at much higher speeds than larger articles. The versatility of the blow molding machine 10 allows it to be used, however, to produce larger articles such as 220-liter industrial barrels. The blow molding machine 10 also targets articles with threads that need to be capped and sealed.

EXAMPLES

The following examples are included to more clearly demonstrate the overall nature of the invention. These examples are exemplary, not restrictive, of the invention.

Figure 11:
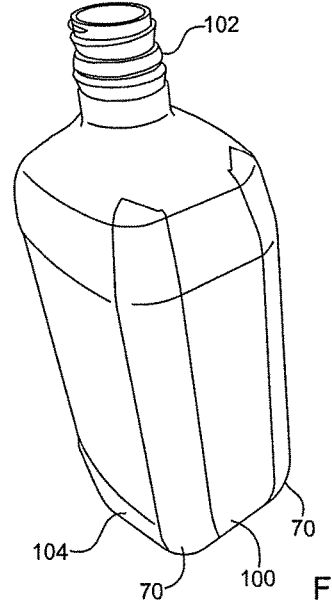
FIG. 11 depicts articles formed using the exemplary blow molding machine according to the present disclosure and illustrating axial ribs at corners in white material for visibility purposes.
Figure 11:
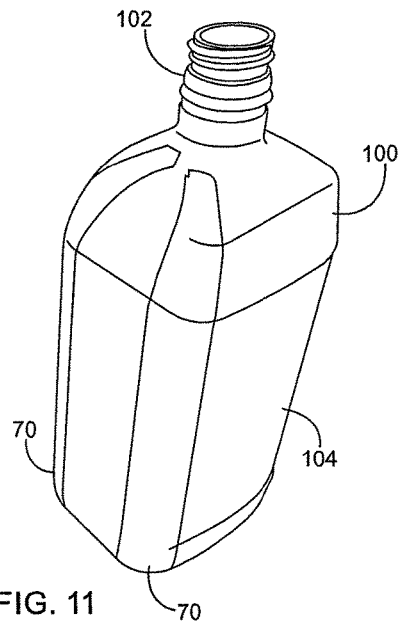

FIG. 11 depicts articles 100 (in this case, motor oil containers) formed using the exemplary blow molding machine 10 and illustrating axial ribs located at the corners 70 of the articles 100. The ribbed corners 70 are shown in white material for purposes of visibility and illustration, highlighting the ribbed corners 70 relative to the body 104 and neck 102 of the article 100. Note that the ribbed corners 70 extend further toward the neck 102 of the article 100 in the article 100 shown at the right in FIG. 11. This difference illustrates the control provided by the blow molding machine 10 over the extent of the reinforcement created in the article 100. In both articles 100 shown in FIG. 11, however, the ribbed corners 70 stop before the threaded neck 102.

Control over the extent of the ribbed corners 70 is advantageous because problems are avoided, such as interference between the threaded neck 102 and the cap (not shown) that engages the threaded neck 102, by limiting the extent of the ribbed corners 70. Many factors, including the ratio and profile of the diverge pin 3, the size and configuration of the SCAT unit 8, and the speed of the extruder 24, must be optimized for each application or setup. Otherwise, there can be bleeding (too much ribbed corner 70 near the neck 102) or the thickness of the ribbed corners 70 will not be consistent throughout the entire article 100.

Figure 12:
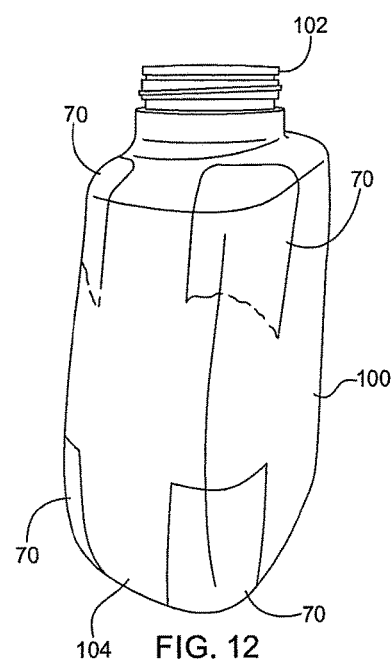
FIG. 12 depicts another article formed using the exemplary blow molding machine according to the present disclosure and illustrating axial ribs being turned on and off at varying thicknesses at different locations of the article.

FIG. 12 depicts another article 100 (in this case, a container used to transport and store liquid such as laundry detergent) formed using the blow molding machine 10. The article 100 illustrates axial ribs being turned on and off at varying thicknesses at different locations of the article 100. Thus, unlike the articles 100 shown in FIG. 11, the ribbed corners 70 of the article 100 shown in FIG. 12 do not extend along the entire length of the corners.

As illustrated in FIGS. 11 and 12, the blow molding machine 10 with its VAP components has been used successfully to add material to specified locations of articles 100. VAP material was added at the four corners of the articles 100, while still reducing the weight of the articles 100. To investigate the structural advantage achieved by adding the material, top-load tests were conducted on the articles 100 illustrated in FIG. 11.

Articles 100 intended as packaging for consumable goods must provide product protection. For example, PET bottles, cans, and cartons have to withstand the compressive forces incurred during handling, transportation, and storage. Manufacturers of beverage containers face the additional challenge of ensuring that containers have sufficient strength to tolerate the capping process.

Key to quantifying the design and quality of many containers is measuring resistance to top loading. Top-load testing, also known as "crush testing" or "compressive strength testing," evaluates the structural resistance of a container to a compressive load to the point of deformation or collapse. Packaging manufacturers use top-load testing to ensure packaging integrity, and to eliminate material excess while maintaining quality, a process known as "downgauging" or "light-weighting." Downgauging is a process with high environmental and business significance, because packaging often soon becomes waste material, and excess material has powerful cost ramifications.

The results of top-load tests conducted on the articles 100 (the motor oil containers or bottles) having ribbed corners 70, as illustrated in FIG. 11, formed using the blow molding machine 10 with its VAP components were as follows: (1) bottle weight=42 grams, top load=64.6 pounds; (2) bottle weight=43.5 grams, top load=69.9 pounds; (3) bottle weight=44.5 grams, top load=74.5 pounds; and (4) bottle weight=45.5 grams, top load=78.7 pounds. A regression analysis performed on these data yielded a straight line having the formula y=4.0542 x−105.95, with an $R^2$ value of 0.9967. The material added had a thickness between 0.178 mm to 0.254 mm (0.007 to 0.010 inches) depending on when and how the VAP material was added to the parison that formed the bottle.

Figure 13:
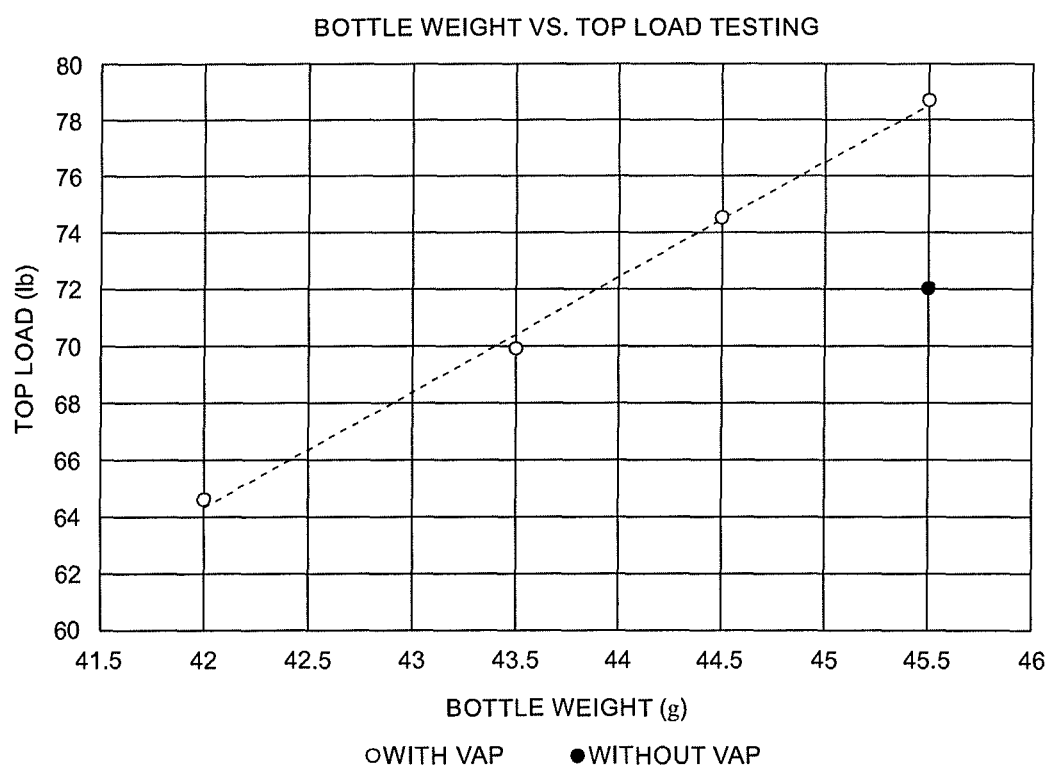
FIG. 13 is a graph illustrating top load advantages achieved using the exemplary blow molding machine according to the present disclosure.

Tests on a control group (bottles having a weight of 45.5 grams formed without the added material) yielded a top load of 72 pounds. FIG. 13 is a graph illustrating the top-load advantage achieved using the exemplary blow molding machine 10 with its VAP components. A bottle of the same weight (45.5 grams) had an increase in top load of about 7 pounds when the VAP material was added over the control bottle without that material. The test results also showed that the added material provided better top-load performance regardless of the bottle weight.

In addition to the improved top-load test results highlighted above, articles 100 formed using the exemplary blow molding machine 10 offer improved environmental stress crack resistance (ESCR) and improved drop test results as compared to conventionally produced articles. And these improvements are achieved at equal or reduced material requirements (e.g., the articles 100 are lightweight).

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed:

1. A blow molding machine for producing an article from a plastic parison, the machine comprising:
   a first flow path connected to a first material source to deliver a first flow of material to a mold;
   a second flow path connected to a second material source to deliver a second flow of material to the mold;
   a tooling unit positioned between the second flow path and the mold, the tooling unit having a distribution ring with at least one channel configured to allow the second flow of material to enter the mold, an aperture with a circumference configured to allow the first flow of material to enter the mold, a top plane with an exit in the top plane defined by the circumference of the aperture, and a height between the top plane and the at least one channel in the range of about 4-60 mm, wherein the height increases the velocity and pressure differentials at the exit which in turn increase the thickness of the parison at the location of the increased pressure and velocity; and
   a means for selectively controlling the flow of the second flow of material to the mold.

2. The blow molding machine as recited in claim 1, further comprising a control system directing the means for selectively controlling the flow of the second flow of material to the mold.

3. The blow molding machine as recited in claim 1, wherein the means for selectively controlling the flow of the second flow of material to the mold includes a servo-controlled accumulation technology (or SCAT) unit.

4. The blow molding machine as recited in claim 3, wherein the SCAT unit includes an accumulator collecting the second material when in a retracted position and delivering the second material when in an extended position, and an actuator directing the accumulator to retract and extend.

5. The blow molding machine as recited in claim 3, further comprising a material duct connecting the SCAT unit and the tooling unit through which the second material is delivered by the SCAT unit to the tooling unit.

6. The blow molding machine as recited in claim 1, wherein the tooling unit further has a bushing body adapted to engage a flow head and has a bushing cap, with the distribution ring mounted between the bushing body and the bushing cap.

7. The blow molding machine as recited in claim 6, wherein the bushing cap, the distribution ring, and the bushing body combine to define the aperture through which the first flow of material travels from the flow head to the mold.

8. The blow molding machine as recited in claim 6, wherein the bushing cap, the bushing body, and the distribution ring are combined by one or more fasteners to create a seal preventing exit of the first flow of material and the second flow of material from the tooling unit except through the aperture.

9. The blow molding machine as recited in claim 6, wherein the bushing cap and the distribution ring combine to form the at least one channel.

10. The blow molding machine as recited in claim 6, wherein multiple channels are configured to allow the second flow of material to enter the mold at separate locations and wherein the bushing cap and the distribution ring combine to form a distribution runner configured to deliver the second flow of material to each of the multiple channels simultaneously.

11. The blow molding machine as recited in claim 10, wherein the distribution runner has a substantially U-shaped outer portion and two, mirror-image, substantially semicircular inner portions, the inner and outer portions interconnected to form an integral distribution runner and a closed path for the second flow of material.

12. A blow molding machine for producing an article from a plastic parison, the machine comprising:
    a first flow path connected to a first material source to deliver a first flow of material to a mold;
    a second flow path connected to a second material source to deliver a second flow of material to the mold;
    a tooling unit positioned between the second flow path and the mold, the tooling unit defining an aperture with a circumference configured to allow the first flow of material to enter the mold and having a distribution ring with at least one channel configured to allow the second flow of material to enter the mold, a top plane with an exit in the top plane defined by the circumference of the aperture, a height between the top plane and the at least one channel in the range of about 4-60 mm, wherein the height increases the velocity and pressure differentials at the exit which in turn increase the thickness of the parison at the location of the increased pressure and velocity, a bushing body adapted to engage a flow head, and a bushing cap with the distribution ring mounted between the bushing body and the bushing cap;
    a means for selectively controlling the flow of the second flow of material to the mold, the means including a servo-controlled accumulation technology (or SCAT) unit; and
    a control system directing the means for selectively controlling the flow of the second flow of material to the mold.

13. The blow molding machine as recited in claim 12, wherein the SCAT unit includes an accumulator collecting the second material when in a retracted position and delivering the second material when in an extended position, and an actuator directing the accumulator to retract and extend.

14. The blow molding machine as recited in claim 12, further comprising a material duct connecting the SCAT unit and the tooling unit through which the second material is delivered by the SCAT unit to the tooling unit.

15. The blow molding machine as recited in claim 12, wherein the bushing cap, the distribution ring, and the bushing body combine to define the aperture through which the first flow of material travels from the flow head to the mold.

16. The blow molding machine as recited in claim 12, wherein the bushing cap, the bushing body, and the distribution ring are combined by one or more fasteners to create a seal preventing exit of the first flow of material and the second flow of material from the tooling unit except through the aperture.

17. The blow molding machine as recited in claim 12, wherein the bushing cap and the distribution ring combine to form the at least one channel.

18. The blow molding machine as recited in claim 12, wherein multiple channels are configured to allow the second flow of material to enter the mold at separate locations and wherein the bushing cap and the distribution ring combine to form a distribution runner configured to deliver the second flow of material to each of the multiple channels simultaneously.

19. The blow molding machine as recited in claim 1, wherein the height between the top plane and the at least one channel in the range of about 4-20 mm.

20. The blow molding machine as recited in claim 12, wherein the height between the top plane and the at least one channel in the range of about 4-20 mm.

* * * * *